(12) United States Patent
Turner

(10) Patent No.: US 7,156,373 B2
(45) Date of Patent: Jan. 2, 2007

(54) LINE RETRIEVAL SYSTEM

(75) Inventor: Mark Turner, Arlington, TX (US)

(73) Assignee: Labor Saving Systems, Ltd., Arlington, TX (US)

( * ) Notice: Subject to any disclaimer, the term of this patent is extended or adjusted under 35 U.S.C. 154(b) by 202 days.

(21) Appl. No.: 10/821,096

(22) Filed: Apr. 8, 2004

(65) Prior Publication Data

US 2004/0211949 A1 Oct. 28, 2004

Related U.S. Application Data

(60) Provisional application No. 60/464,985, filed on Apr. 24, 2003.

(51) Int. Cl.
*E21C 29/16* (2006.01)
(52) U.S. Cl. .......................................... 254/134.3 FT
(58) Field of Classification Search ....... 254/134.3 FT, 254/134.3 R, 134.4, 134.5; 294/65.5
See application file for complete search history.

(56) References Cited

U.S. PATENT DOCUMENTS

| | | | |
|---|---|---|---|
| 2,812,921 A | * | 11/1957 | Leith, Jr. ................. 254/134.5 |
| 3,078,073 A | | 2/1963 | Zizzo |
| 3,924,115 A | | 12/1975 | Hampton et al. |
| 3,971,543 A | | 7/1976 | Shanahan |
| 4,467,514 A | | 8/1984 | Dahlke |
| 4,527,775 A | | 7/1985 | Flowers |
| 4,572,561 A | | 2/1986 | Hale |
| 5,522,630 A | | 6/1996 | James |

* cited by examiner

*Primary Examiner*—Robert C. Watson
(74) *Attorney, Agent, or Firm*—Munsch Hardt Kopf & Harr, P.C.

(57) ABSTRACT

A line retrieval system comprises a line retriever adapted to magnetically couple to an object disposed within an enclosure through a wall of the enclosure such that the magnetic couple supports the line retriever adjacent the wall of the enclosure. The line retriever is adapted for movement relative to the enclosure in response to movement of the object within the enclosure toward an opening formed in the enclosure.

20 Claims, 4 Drawing Sheets

LINE RETRIEVAL SYSTEM

CROSS-REFERENCE TO RELATED APPLICATIONS

This application claims priority to U.S. Provisional Application No. 60/464,985, filed Apr. 24, 2003, entitled "Line Retriever."

TECHNICAL FIELD OF THE INVENTION

The present invention relates generally to the field of building and construction tools and, more particularly, to a line retrieval system.

BACKGROUND OF THE INVENTION

In the past, the most commonly used method of locating a suspended wire or line within a wall or other type of enclosed structure involved cutting a small hole in a portion of the wall, inserting a hooked rod through the hole, and attempting to snare and retrieve the line through the hole. This method involves considerable guesswork and error and is not easy to do even for an experienced technician.

SUMMARY OF THE INVENTION

The present invention relates to a device for capturing and/or retrieving an object, such as a wire or line, from within a wall or other type of enclosure. In accordance with one embodiment of the present invention, a line retriever comprises a housing adapted to magnetically couple to an object disposed within an enclosure through a wall of the enclosure such that the magnetic couple supports the housing adjacent the wall of the enclosure. The line retriever also comprises a roller assembly coupled to the housing and adapted to provide rolling movement of the housing relative to the enclosure in response to movement of the object within the enclosure toward an opening formed in the enclosure. In one embodiment, the line retriever may also comprise a counterweight assembly to maintain substantially vertical movement of the line retriever relative to the wall or enclosure.

The present invention provides several technical advantages. For example, electricians and installers of electrical fixtures, home entertainment centers, alarms, computer networks, and telephones in houses, office buildings, and other structures often spend considerable time and effort in locating and retrieving electrical wires, conduits, or other types of lines or cables. The present invention provides a quick and efficient method for retrieving objects from within walls or other types of enclosed structures. The line retriever of the present invention may be used by a single user, thereby substantially alleviating a requirement of multiple persons for retrieval tasks. Additionally, the present invention substantially prevents damage to outer surfaces of walls or enclosures by providing smooth rolling movement of the line retriever relative to the wall. Further, a counterweight assembly may be used with the line retriever to maintain substantially vertical movement of the line retriever relative to the wall or enclosure and vertical realignment of the line retriever after encountering a non-smooth surface condition or object on the wall or enclosure.

DETAILED DESCRIPTION OF THE DRAWINGS

Figure 1:
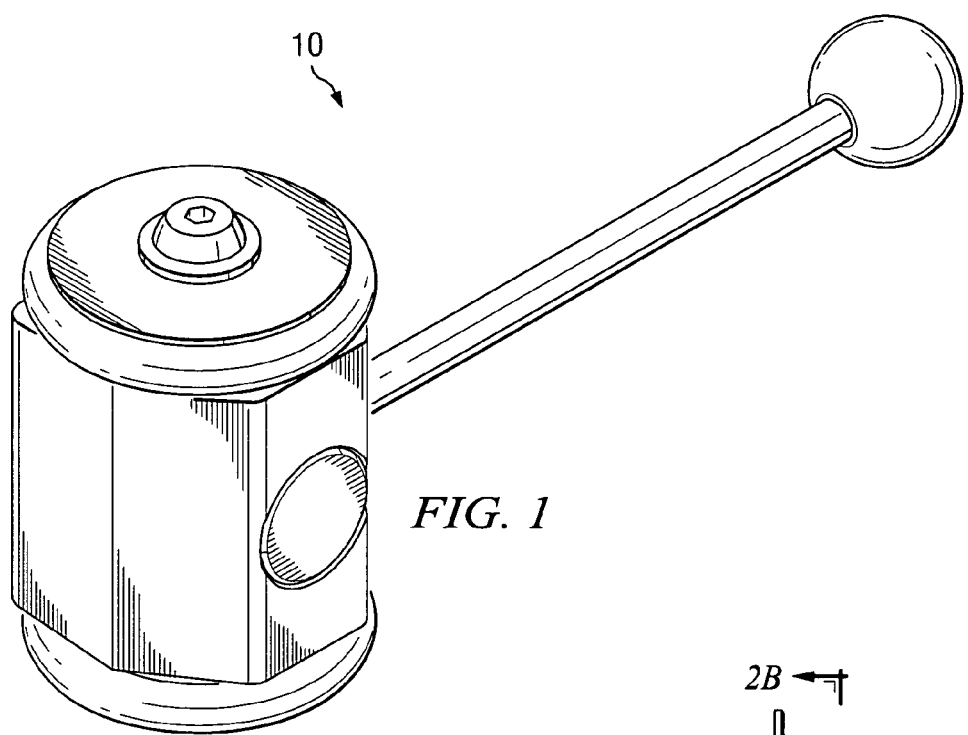
FIG. 1 is a diagram illustrating a line retriever in accordance with one embodiment of the present invention.

FIGS. 1 through 4 are diagrams illustrating a line retrieval system 8 in accordance with one embodiment of the present invention. According to the present invention, a technician or other user locates a line retriever 10 in close proximity to or in contact with a wall or other enclosure 12 through which a wire or line is to be retrieved. The line may comprise a telephone line, optical or coaxial cable, electrical wire, or other type of cable, wire, conduit or other structure of which retrieval from the enclosure 12 may be desired. A hole or other type of opening 14 may be formed in the enclosure 12 as best illustrated in FIGS. 2B and 3A. The user of the retriever 10 may lower an object 16 into the enclosure 12 via a line 18 from an upward location. For example, a ceiling tile or other type of structure may be removable to provide access to an internal area of structure 12. Alternatively, an opening may be formed in an upwardly located portion of enclosure 12 to provide access to an interior area 19 of enclosure 12.

Figure 3C:
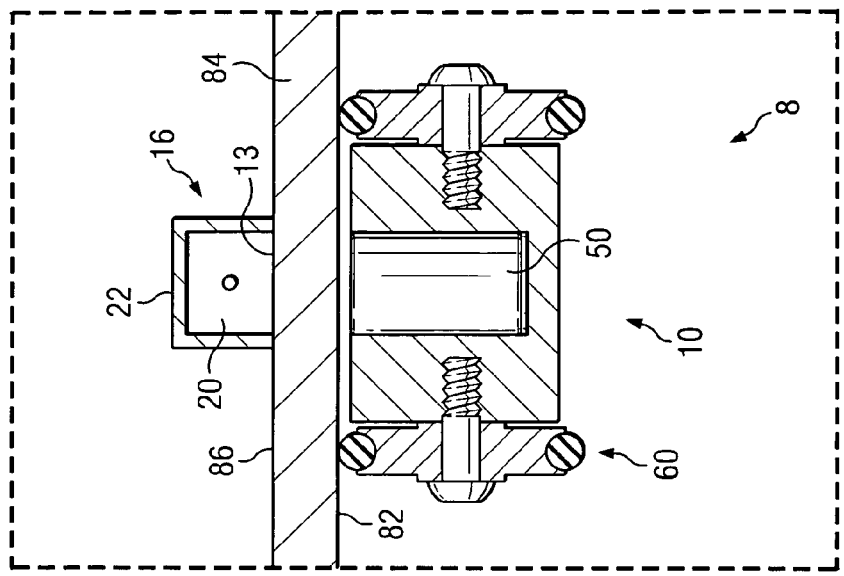
FIG. 3C is an enlarged view of the line retriever illustrated in FIG. 3B.
Figure 3A:
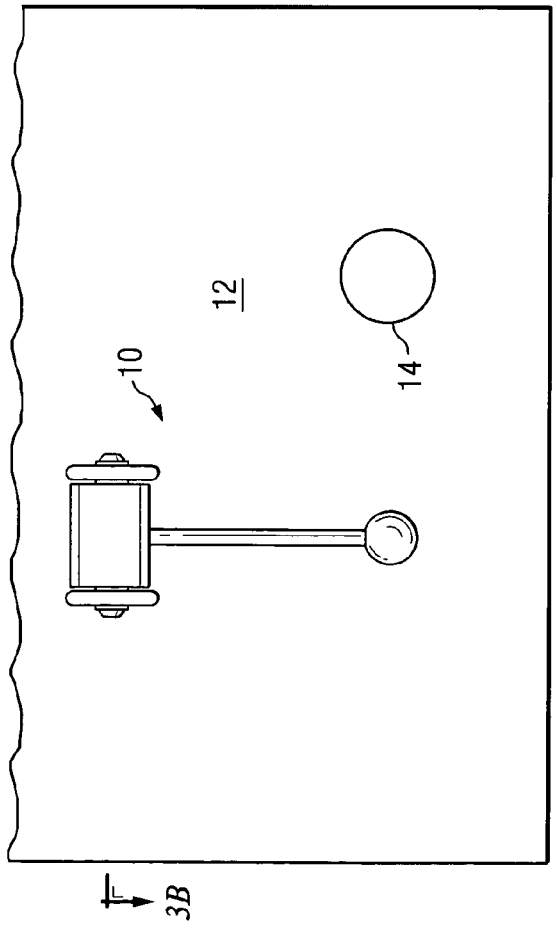
FIG. 3A is a diagram illustrating another view of the line retriever of FIG. 1 relative to an enclosure.

As best illustrated in FIG. 3C, object 16 preferably comprises a magnet 20; however, object 16 may also comprise another type of material generally attracted or otherwise responsive to a magnetic field. In the illustrated embodiment, magnet 20 is disposed partially within a sleeve 22. Sleeve 22 may comprise plastic, copper, or another type of non-magnetic material to substantially prevent attraction of magnet 20 to metallic structure, such as a metallic stud or metallic conduit, located within enclosure 12. As will be described in greater detail below, magnet 20 is located within sleeve 22 such that a pole of magnet 20 is directed toward a magnetically attracting pole of a magnet disposed in retriever 10. Thus, for example, in some embodiments, sleeve 22 comprises at least one open side or portion 23 adapted to be disposed toward retriever 10 to enable magnetic coupling of object 16 with retriever 10 while substantially preventing object 16 from becoming magnetically coupled with another object or device, such as, but not limited to, a metallic stud or conduit.

Figure 4B:
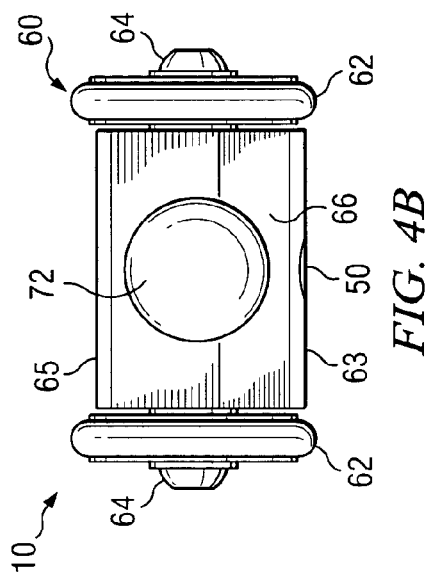
FIG. 4B is a diagram illustrating a profile view of the line retriever illustrated in FIG. 1.
Figure 4D:
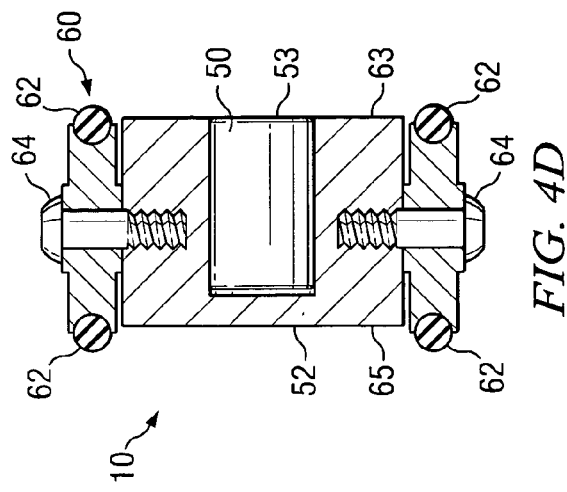
FIG. 4D is a diagram illustrating a sectional view of the line retriever taken along the line 4D—4D of FIG. 4A.
Figure 4A:
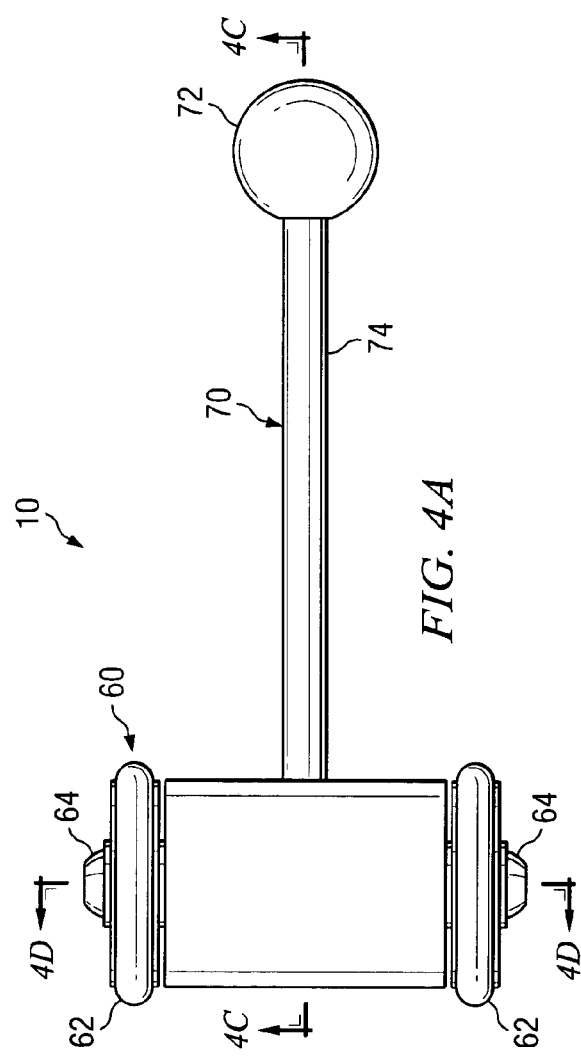
FIG. 4A is a diagram illustrating a plan view of the line retriever illustrated in FIG. 1.
Figure 4C:
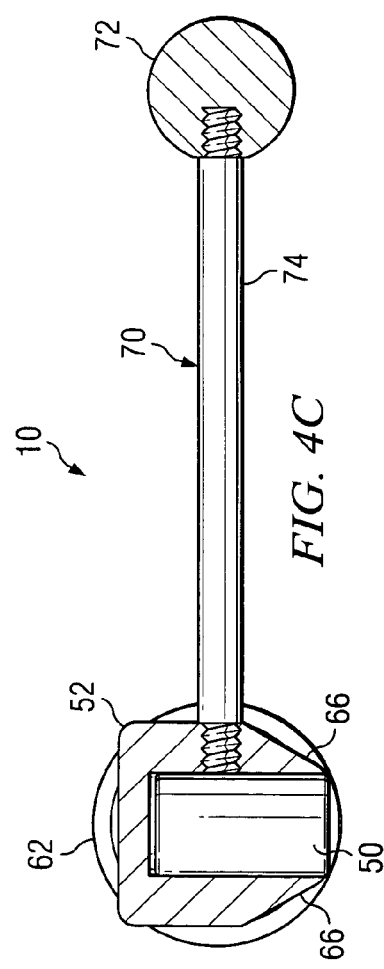
FIG. 4C is a diagram illustrating a sectional view of the line retriever taken along the line 4C—4C of FIG. 4A.

Referring to FIGS. 4A–4D, retriever 10 comprises a magnet 50 disposed within a housing 52. As best illustrated in FIG. 4D, retriever 10 is configured such that magnet 50 extends partially through housing 52 to at least one open side or portion 53 of housing 52 to enable magnetic coupling of magnet 50 with object 16; however, it should be understood that retriever 10 may also be configured such that magnet 50 extends though housing 52 such that at least a portion of magnet 50 is exposed on opposite sides of housing 52. Retriever 10 also comprises a roller assembly 60 to enable rolling movement of retriever 10 relative to enclosure 12. In the illustrated embodiment, roller assembly 60 comprises a plurality of oppositely disposed and parallel oriented wheels 62 rotatably coupled to housing 52 via a pin 64 threadably coupled to housing 52. However, it should be understood that other types of devices may be used to provide rolling movement of retriever relative to enclosure 12 such as, but not limited to, ball bearings or other spherical objects. Wheels 62 are selected having a diameter grater that a cross-sectional dimension of housing 52 such that wheels 62 extend beyond outer surfaces 63 and 65 of housing 52, thereby preventing a portion or surface of housing 52 directed toward enclosure 12 from contacting enclosure 12. For example, in the illustrated embodiment, retriever 10 is configured such that surface 63 of housing 52 is directed toward a surface of enclosure 12 during use. As best illustrated in FIGS. 4A–4D, wheels 62 are selected having a radial dimension such that surface 63 is set back relative to the portion of wheels 62 in contact with a surface of enclosure 12 to prevent surface 63 of housing 52 from contacting enclosure 12, thereby preventing damage to a surface of enclosure 12 during movement of retriever 10 relative to enclosure 12. Additionally, housing 52 may also be configured having oppositely disposed chamfer portions 66 to reduce the portion of housing 52 near enclosure 12 during use to further prevent the likelihood of housing 52 contacting enclosure 12 during use.

As illustrated in FIGS. 4A–4D, retriever 10 also comprises a counterweight assembly 70 coupled to housing 52 to maintain vertical downward movement of retriever 10 relative to enclosure 12. Line retriever 10 may be configured such that counterweight assembly 70 is removably or permanently coupled to housing 52. In the illustrated embodiment, assembly 70 comprises a weight 72 coupled to housing 52 via a rod 74. Weight 72 preferably comprises a spherical configuration to enable smooth movement over an outer surface of enclosure 12; however, it should be understood that other geometric configurations may also be used.

Figure 2A:
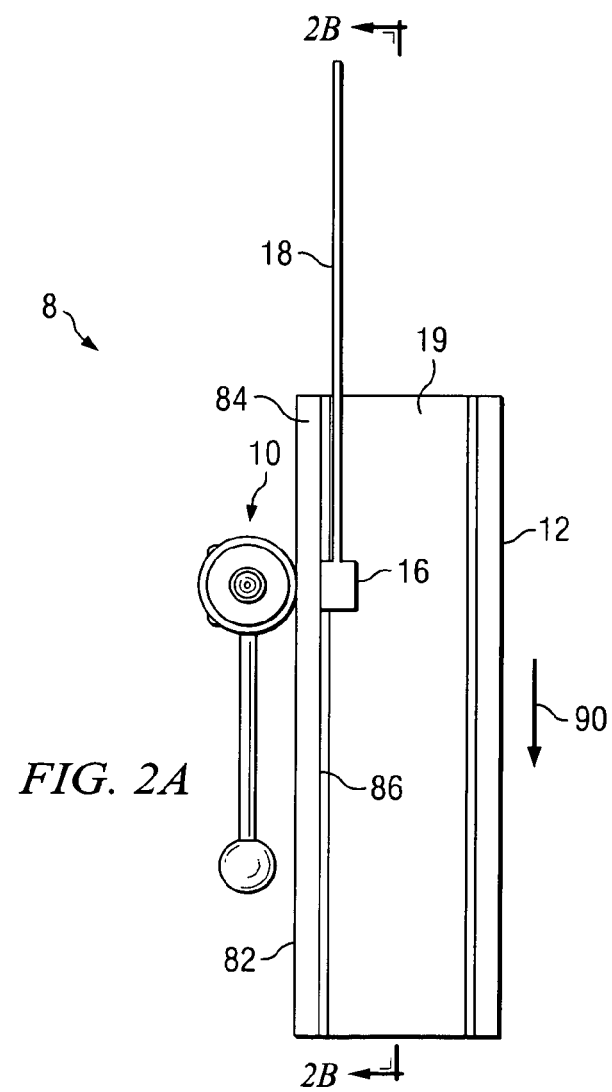
FIG. 2A is a diagram illustrating the line retriever of FIG. 1 relative to an enclosure.
Figure 2B:
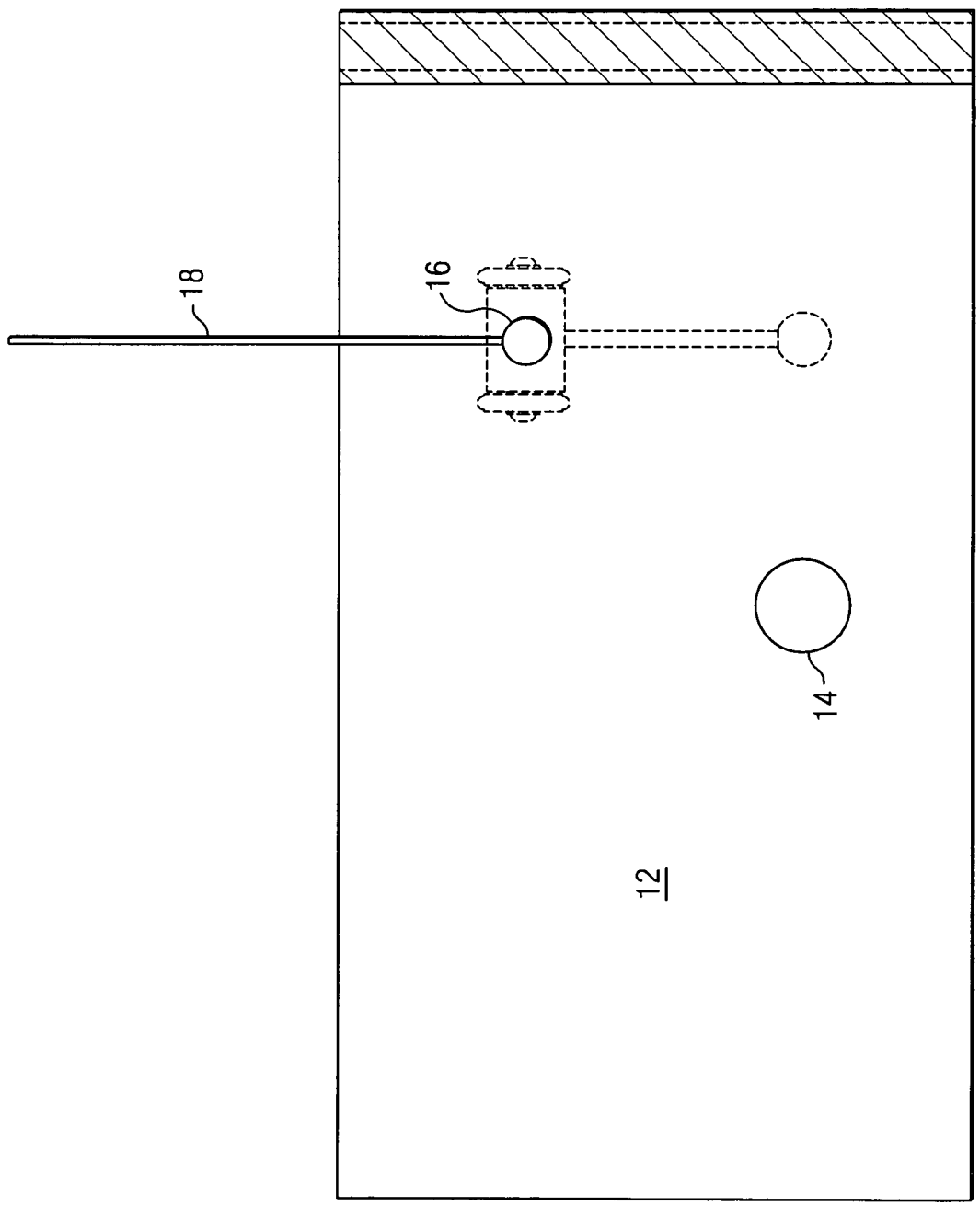
FIG. 2B is a diagram illustrating a sectional view taken along the line 2B—2B of FIG. 2A.
Figure 3B:
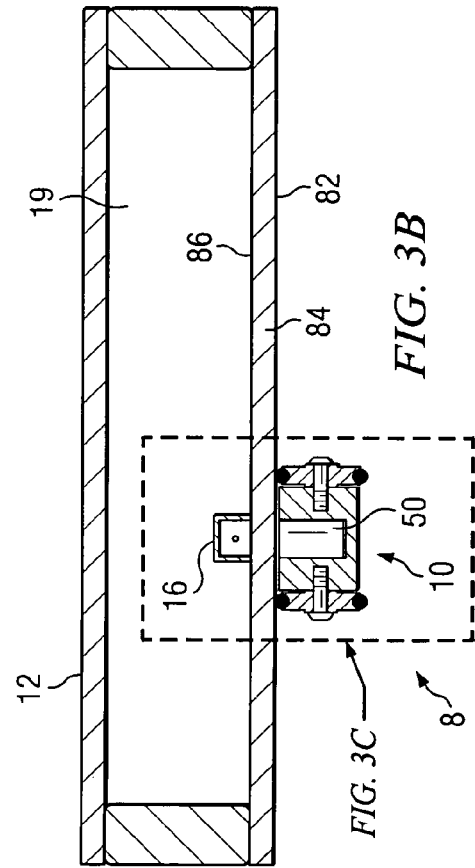
FIG. 3B is a diagram illustrating a sectional view taken along the line 3B—3B of FIG. 3A.

Referring to FIGS. 2 and 3, in operation, object 16 is lowered into interior area 19 of enclosure 12. Retriever 10 is also placed outside of enclosure 12 and in contact with an exterior surface 82 of a wall 84 of enclosure 12 such that magnet 50 of retriever 10 attracts object 16 toward an interior surface 86 of wall 84. In one embodiment, object 16 comprises magnet 20 and sleeve 22 such that magnets 20 and 50 have attracting poles facing each other, thereby providing a magnetic shield via sleeve 22 to substantially prevent magnet 20 from being attracted to metallic structures disposed within enclosure 12.

After object 16 and magnet 50 are magnetically coupled, the user may release retriever 10 and feed line 18 downwardly into interior area 19 of enclosure 12. Preferably, retriever 10 is constructed having minimal weight such that the magnetic coupling between retriever 10 and object 16 supports retriever 10 against enclosure 12 without user intervention. In operation, the weight of retriever 10 draws object 16 downwardly in the direction indicated generally at 90 within enclosure 12 as line 18 is fed into enclosure 12. As object 16 travels downwardly within enclosure 12, roller assembly 60 provides generally smooth movement of retriever 10 downwardly along surface 82 of enclosure 12 while substantially preventing damage to surface 82. Additionally, roller assembly 60 enables retriever 10 to transition over non-smooth surface 82 conditions, such as textured paint or other types of non-smooth surface conditions.

Additionally, as retriever 10 travels downwardly relative to enclosure 12, counterweight assembly 70 maintains generally vertical movement of retriever 10 relative to enclosure 12. For example, if retriever 10 encounters a surface condition on surface 82 of enclosure that causes non-vertical movement of retriever 10 relative to enclosure 12, after retriever moves over or otherwise passes by such surface condition, the weight of counterweight assembly 70 causes a realignment of retriever 10 to a vertical orientation relative to enclosure 12.

After retriever 10 has traveled downwardly to a location proximate to opening 14, the user may then move retriever 10 toward opening 14 and draw object 16 from within enclosure 12 through opening 14. Thus, the present invention enables the retrieval of a line from an enclosure by a single user. Additionally, the present invention provides a method for line retrieval from an enclosure having metallic structure disposed therein. For example, as described above, object 16 may comprise a sleeve 22 to shield the magnetic forces of magnet 20 from being attracted to metallic structures disposed within enclosure 12. Further, the present invention provides line retrieval from an enclosure by maintaining object 16 in close proximity or in contact with interior surface 86 of enclosure 12, thereby avoiding structure disposed within enclosure 12 that may otherwise interfere with the downward movement of object 16 within enclosure 12. Also, counterweight assembly 70 provides substantially vertical movement of retriever 10 relative to enclosure 12 despite surface irregularities of enclosure 12, and roller assembly 60 enables smooth travel downwardly of retriever 10 relative to enclosure 12 to substantially prevent damage to a surface of enclosure 12.

What is claimed is:

1. A line retriever, comprising:
 a housing adapted to magnetically couple to an object disposed within an enclosure through a wall of the enclosure, the magnetic couple supporting the housing adjacent the wall of the enclosure; and
 a roller assembly coupled to the housing and adapted to provide rolling movement of the housing relative to the enclosure in response to movement of the object toward an opening formed in the enclosure; and
 a counterweight assembly coupled to the housing and configured to automatically realign the line retriever from a non-vertical orientation to a vertical orientation relative to the enclosure.

2. The retriever of claim 1, wherein the conterweight assembly is configured to maintain substantially vertical movement of the housing relative to the enclosure.

3. The retriever of claim 1, wherein the roller assembly comprises a plurality of oppositely disposed wheels rotatably coupled to the housing.

4. The retriever of claim 1, counterweight assembly comprises a spherical weight.

5. The line retriever of claim 1, wherein the counterweight assembly comprises a weight coupled to the housing via a rod.

6. The retriever of claim 1, wherein the housing comprises a magnet.

7. The retriever of claim 1, wherein the housing is adapted to magnetically couple to a sleeved object disposed within the enclosure.

8. The retriever of claim 1, wherein the roller assembly is sized having a diameter greater than a cross-sectional dimension of the housing.

9. The retriever of claim 1, wherein the roller assembly is sized to prevent contact of the housing with a surface of the wall of the enclosure.

10. A line retriever, comprising:
means for magnetically coupling a housing disposed outside of an enclosure to an object disposed within the enclosure through a wall of the enclosure, the magnetic coupling means supporting the housing adjacent the wall of the enclosure;
means for enabling rolling movement of the housing relative to the enclosure in response to movement of the object toward an opening formed in the enclosure; and
means for automatically realigning the line retriever from a non-vertical orientation to a vertical orientation relative to the enclosure.

11. The retriever of claim 10, wherein the realigning means comprises means for maintaining substantially vertical movement of the housing relative to the enclosure.

12. The retriever of claim 10, wherein the realigning means comprises means for coupling a weight means disposed at one end thereof to the housing.

13. The retriever of claim 10, wherein the means for enabling rolling movement is sized to prevent contact of the housing with a surface of the wall of the enclosure.

14. A line retrieval system, comprising:
an object adapted to be disposed within an enclosure; and
a line retriever adapted to magnetically couple to the object through a wall of the enclosure, the line retriever adapted to move relative to the enclosure in response to movement of the object within the enclosure to draw the object toward an opening formed in the enclosure the line retriever comprising a counterweight assembly configured to automatically realign the line retriever from a non-vertical orientation to a vertical orientation relative to the enclosure.

15. The line retrieval system of claim 14, wherein the object is disposed within a sleeve.

16. The line retrieval system of claim 15, the sleeve adapted to prevent magnetic coupling of the object to another object disposed within the enclosure.

17. The line retrieval system of claim 15, wherein the sleeve comprises at least one open side portion adapted to be disposed toward an interior surface of the wall of the enclosure.

18. The line retrieval system of claim 14, wherein the line retriever is adapted for rolling movement relative to the enclosure in response to movement of the object within the enclosure.

19. The line retrieval system of claim 14, wherein the counterweight assembly is adapted to maintain substantially vertical movement of the line retriever relative to the enclosure in response to movement of the object within the enclosure.

20. The line retrieval system of claim 14, the magnetic couple supporting the line retriever adjacent the wall of the enclosure.

* * * * *